United States Patent
Im et al.

(10) Patent No.: US 10,256,474 B2
(45) Date of Patent: Apr. 9, 2019

(54) CATHODE COMPOSITION, CATHODE AND FUEL CELL INCLUDING SAME

(71) Applicant: LG CHEM, LTD., Seoul (KR)

(72) Inventors: Sanghyeok Im, Daejeon (KR); Tai Min Noh, Daejeon (KR); Changseok Ryoo, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/580,384

(22) PCT Filed: Jun. 10, 2016

(86) PCT No.: PCT/KR2016/006185
§ 371 (c)(1),
(2) Date: Dec. 7, 2017

(87) PCT Pub. No.: WO2016/200206
PCT Pub. Date: Dec. 15, 2016

(65) Prior Publication Data
US 2018/0198133 A1    Jul. 12, 2018

(30) Foreign Application Priority Data

Jun. 11, 2015 (KR) .......... 10-2015-0082733

(51) Int. Cl.
*H01M 8/10* (2016.01)
*H01M 4/86* (2006.01)
*H01M 8/124* (2016.01)
*H01M 8/1246* (2016.01)
*H01M 4/04* (2006.01)

(52) U.S. Cl.
CPC ....... *H01M 4/8652* (2013.01); *H01M 4/0407* (2013.01); *H01M 4/0471* (2013.01); *H01M 4/86* (2013.01); *H01M 8/124* (2013.01); *H01M 8/1246* (2013.01); *Y02E 60/525* (2013.01); *Y02P 70/56* (2015.11)

(58) Field of Classification Search
CPC ...................................................... H01M 8/10
See application file for complete search history.

(56) References Cited

U.S. PATENT DOCUMENTS

| 2012/0178016 A1 | 7/2012 | Park et al. |
| 2012/0251917 A1 | 10/2012 | Son et al. |
| 2018/0159142 A1 | 6/2018 | Im et al. |

FOREIGN PATENT DOCUMENTS

| JP | 2002-097021 | * 4/2002 |
| WO | WO 2014/172752 A1 | 10/2014 |
| WO | WO 2016/190699 A1 | 12/2016 |

OTHER PUBLICATIONS

Baek et al., "Mixed Conductivity and Electrode Properties of Mn-Doped Bi—Sr—Fe Based Perovskite-Type Oxides", Solid State Ionics, vol. 253, 2013 (Available online Oct. 26, 2013), pp. 211-216.
Extended European Search Report dated Nov. 6, 2018 for Application No. 16807846.7.

\* cited by examiner

*Primary Examiner* — Jacob B Marks
(74) *Attorney, Agent, or Firm* — Birch, Stewart, Kolasch & Birch, LLP

(57) ABSTRACT

The present disclosure relates to an air electrode composition, an air electrode, and a fuel cell including the same.

16 Claims, 1 Drawing Sheet

[FIG. 1]
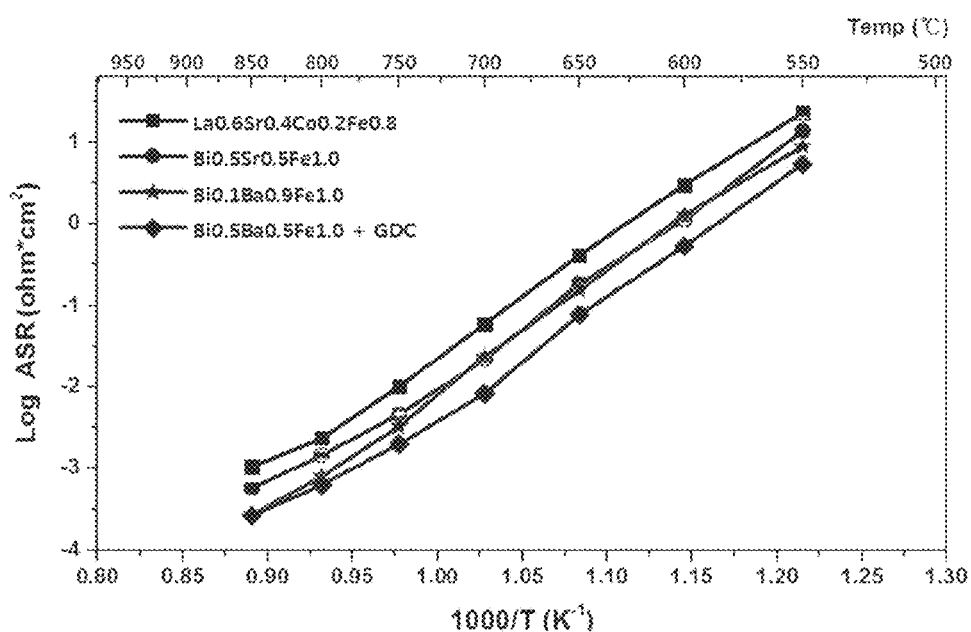
[FIG. 2]
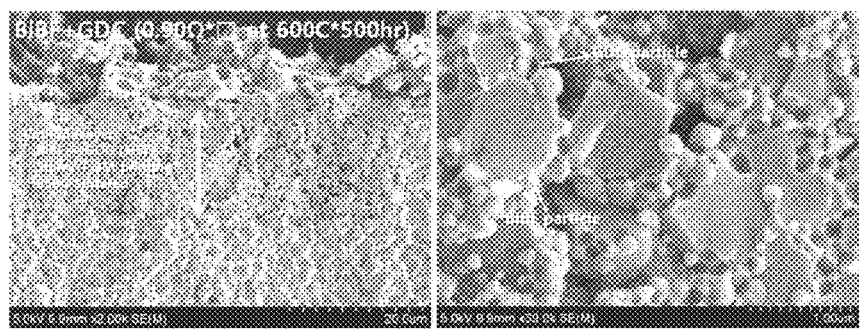

CATHODE COMPOSITION, CATHODE AND FUEL CELL INCLUDING SAME

TECHNICAL FIELD

The present specification claims priority to and the benefits of Korean Patent Application No. 10-2015-0082733, filed with the Korean Intellectual Property Office on Jun. 11, 2015, the entire contents of which are incorporated herein by reference.

The present specification relates to an air electrode composition, an air electrode and a fuel cell including the same.

BACKGROUND ART

Fuel cells are a device directly converting chemical energy of fuel and air to electricity and heat through an electrochemical reaction. Unlike existing power generating technologies taking processes of fuel combustion, steam generation, turbine driving and generator driving, fuel cells do not have a combustion process or a driving device, and therefore, do not induce environmental problems while providing high efficiency. Such fuel cells are pollution free power generation since air pollution substances such as SOx and NOx are hardly discharged and generation of carbon dioxide is small as well, and have advantages of low noises and non-vibration.

Fuel cells employ various types such as phosphoric acid-type fuel cells (PAFC), alkali-type fuel cells (AFC), polymer electrolyte membrane-type fuel cells (PEMFC), direct methanol fuel cells (DMFC) and solid oxide fuel cells (SOFC), and among these, solid oxide fuel cells have advantages in that high efficiency may be expected unlike thermal power generation and fuel diversity is obtained, and in addition thereto, it is less dependent on high-priced catalysts compared to other fuel cells since solid oxide fuel cells are operated at high temperatures of 800° C. or higher.

However, despite an advantage of increasing electrode activity, a high temperature-operating condition may lead to problems caused by durability and oxidation of metal materials forming a solid oxide fuel cell. Accordingly, many institutes domestic and abroad have made a great deal of efforts in developing medium-low temperature-type solid oxide fuel cells.

As an air electrode material of such medium-low temperature-type solid oxide fuel cells, lanthanum strontium cobalt ferrite (LSCF) is typically used as a perovskite-type ($ABO_3$) oxide particle, and lanthanum strontium cobalt ferrite is a material having highest applicability at medium-low temperatures compared to other compositions in terms of chemical durability, long-term stability and electrical properties.

However, there is still much room for improvement in the lanthanum strontium cobalt ferrite in terms of long-term stability and electrochemical aspects, and such studies are still in process.

DISCLOSURE

Technical Problem

One embodiment of the present specification is directed to providing an air electrode composition.

Another embodiment of the present specification is directed to providing an air electrode including the air electrode composition.

Another embodiment of the present specification is directed to providing an air electrode formed with the air electrode composition.

Another embodiment of the present specification is directed to providing a fuel cell including the air electrode.

Another embodiment of the present specification is directed to providing a method for manufacturing the fuel cell.

Another embodiment of the present specification is directed to providing a cell module including the fuel cell as a unit cell.

Technical Solution

One embodiment of the present specification provides an air electrode composition including an oxide particle represented by the following Chemical Formula 1 and having a perovskite-type ($ABO_3$) structure, and an electrolyte material.

$$Bi_x(M1)_{1-x}EO_{3-\delta} \quad \text{[Chemical Formula 1]}$$

In Chemical Formula 1, $0.2 < x < 0.8$,

M1 is one or more elements selected from the group consisting of barium (Ba), sodium (Na), potassium (K) and gadolinium (Gd), E is one or more elements selected from the group consisting of magnesium (Mg), aluminum (Al), vanadium (V), gallium (Ga), germanium (Ge), niobium (Nb), molybdenum (Mo), indium (In), tin (Sn), hafnium (Hf), tantalum (Ta), tungsten (W), titanium (Ti), chromium (Cr), manganese (Mn), nickel (Ni), cobalt (Co), copper (Cu), zinc (Zn), holmium (Ho), erbium (Er), thulium (Tr), ytterbium (Yb) and iron (Fe), and $\delta$ is a value making the oxide particle electrically neutral.

Another embodiment of the present specification provides an air electrode including the air electrode composition.

Another embodiment of the present specification provides an air electrode formed with the air electrode composition.

Another embodiment of the present specification provides a fuel cell including the air electrode; a fuel electrode; and an electrolyte provided between the air electrode and the fuel electrode.

*25 Another embodiment of the present specification provides a method for manufacturing a fuel cell including forming an air electrode by coating the air electrode composition on an electrolyte surface and then sintering the result; and forming a fuel electrode on a surface opposite to the air electrode-formed surface of the electrolyte.

Another embodiment of the present specification provides a cell module including the fuel cell as a unit cell.

Advantageous Effects

An air electrode composition according to one embodiment of the present specification has an advantage of having excellent sheet resistance performance compared to existing electrode compositions.

In addition, an air electrode composition according to one embodiment of the present specification has an advantage of having low reactivity with an electrolyte material.

An oxide particle according to one embodiment of the present specification has a similar coefficient of thermal expansion with an electrolyte material and thereby has an advantage of having excellent chemical resistance when used in an air electrode of a fuel cell.

*31 An air electrode formed with the air electrode composition according to one embodiment of the present specification has advantages in that performance decline and durability decrease caused by long-term time variations are small.

DESCRIPTION OF DRAWINGS

FIG. 1 is a diagram comparing sheet resistance performance between an air electrode material according to one embodiment of the present specification and air electrode materials of Comparative Examples 1 to 3.

FIG. 2 is a diagram showing that oxide particles and electrolyte particles are present in a final air electrode formed by coating an air electrode composition on an electrolyte and sintering the result.

MODE FOR DISCLOSURE

Advantages and features of the present application, and methods for achieving these advantages and features will become clear when referencing embodiments described below in detail with the accompanying drawings. However, the present application is not limited to the embodiments described below, and will be realized in various different forms, and the present embodiments make the disclosure of the present application complete, and are provided in order to completely make known the range of the disclosure to those skilled in the art, and the present application is only defined by the scope of the claims.

Unless otherwise specified, all the terms including technical and scientific terms used in the present specification may be used according to the meanings commonly understandable to those skilled in the art. In addition, the terms defined in generally used dictionaries are not interpreted either ideally or immoderately unless clearly specially defined otherwise.

In the present specification, a description of a certain part "including" certain constituents means capable of further including other constituents, and does not exclude other constituents unless particularly stated on the contrary.

In the present specification, a description of a certain part "including" certain constituents means capable of further including other constituents, and does not exclude other constituents unless particularly stated on the contrary.

Hereinafter, the present disclosure will be described in detail.

One embodiment of the present specification provides an air electrode composition including an oxide particle represented by the following Chemical Formula 1 and having a perovskite-type (ABO$_3$) structure, and an electrolyte material.

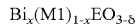  [Chemical Formula 1]

In Chemical Formula 1, 0.2<x<0.8,

M1 is one or more elements selected from the group consisting of barium (Ba), sodium (Na), potassium (K) and gadolinium (Gd), E is one or more elements selected from the group consisting of magnesium (Mg), aluminum (Al), vanadium (V), gallium (Ga), germanium (Ge), molybdenum (Mo), indium (In), tin (Sn), hafnium (Hf), tantalum (Ta), tungsten (W), titanium (Ti), chromium (Cr), manganese (Mn), nickel (Ni), cobalt (Co), copper (Cu), zinc (Zn), niobium (Nb), holmium (Ho), erbium (Er), thulium (Tr), ytterbium (Yb) and iron (Fe), and δ is a value making the oxide particle electrically neutral.

According to one embodiment of the present specification, the δ represents oxygen vacancy, and means a value making the oxide particle represented by Chemical Formula 1 electrically neutral, and for example, may have a value of 0.1 to 0.4.

Existing fuel cells are operated at a higher temperature of higher than 850° C. and lower than or equal to 1000° C., and therefore, when considering chemical or physical stability of fuel cell constituents, there have been disadvantages in that material selection is limited much and incidental expenses for maintaining efficiency at a high temperature are quite high.

Accordingly, when lowering an operating temperature of the fuel cell, advantages such as an increase of materials applicable in fuel cell constituents as well as securing long-term stability of materials may be obtained.

In view of the above, needs to lower an operating temperature of a fuel cell to a medium-low temperature of higher than or equal to 600° C. and lower than or equal to 850° C. have emerged, and needs for materials and constitutions that may be used at a medium-low temperature have increased.

However, when operating a solid oxide fuel cell at a medium-low temperature, problems such as an increase in the resistance of an air electrode occurs, and lanthanum strontium cobalt ferrite (LSCF) that has been much used as an air electrode material of existing medium-low temperature-type fuel cells needs to be supplemented in terms of long-term stability and electrochemical properties.

In view of the above, the inventors of the present disclosure have performed studies on an air electrode composition having more superior performance and invented an air electrode composition including an oxide particle represented by Chemical Formula 1 and having a perovskite-type structure and an electrolyte material, and have identified that forming an air electrode of a fuel cell using the air electrode composition including the oxide particle and the electrolyte material according to one embodiment of the present specification is effective in decreasing sheet resistance and/or increasing chemical durability of the cell, and the like.

In other words, although effects such as a sheet resistance decrease and/or a chemical durability increase of a battery are obtained when using the oxide particle represented by Chemical Formula 1 as a material of an air electrode according to one embodiment of the present specification, battery performance has been discovered to decline with a long passage of time.

In view of the above, the inventors of the present disclosure have completed the present disclosure preventing performance decline and durability decrease even with a long passage of time by using the oxide particle represented by Chemical Formula 1 with an electrolyte material as an air electrode material.

In the present specification, the perovskite-type an oxide particle means a metal oxide particle having a cubic crystal structure exhibiting a superconductivity phenomenon as well as nonconductor, semiconductor and conductor properties.

According to one embodiment of the present specification, the perovskite-type oxide particle may be represented by a chemical formula of ABO3. The position of A is a vertex of a cubic unit and the position of B is a center of a cubic unit, and such elements have a coordination number of 12 together with oxygen. Herein, any one or two or more elements of cations selected from among rare earth elements, alkaline earth elements and transition elements may be located in A and/or B.

For example, one, two or more types of cations that are large and have a low atomic value are located in A, and cations that are small and have a high atomic value are generally located in B, and metal atoms in the A and B positions are coordinated by 6 oxygen ions in the octahedron coordination.

According to one embodiment of the present specification, M1 is barium (Ba).

According to one embodiment of the present specification, M1 is barium (Ba), and E is preferably one or more elements selected from the group consisting of titanium (Ti), chromium (Cr), manganese (Mn), nickel (Ni), cobalt (Co), copper (Cu) and zinc (Zn) that are transition metals.

According to one embodiment of the present specification, M1 is barium (Ba), and E is preferably an iron (Fe) or cobalt (Co) element.

According to one embodiment of the present specification, E is iron (Fe).

According to one embodiment of the present specification, x is $0.2<x<0.8$, more preferably $0.3 \leq x \leq 0.7$, and $0.4 \leq x \leq 0.6$, or 0.5.

According to one embodiment of the present specification, when x is in the above-mentioned range, a perovskite-type metal oxide particle is readily formed, and reactivity with an electrolyte may be low. In addition, effects of excellent sheet resistance performance and excellent durability are obtained.

According to one embodiment of the present specification, Chemical Formula 1 may be represented by $Bi_{0.5}Ba_{0.5}FeO_3$.

According to one embodiment of the present specification, E may be represented by $(E1)_y(E2)_{1-y}$, y is $0<y \leq 1$, E1 and E2 are the same as or different from each other, and E1 and E2 have the same definitions as E.

In addition, according to one embodiment of the present specification, E may be represented by $(E1)_y(E2)_z(E3)_{1-y-z}$, y and z are the same as or different from each other and each $0<y<1$, $0<z \leq 1$ and $0<y+z \leq 1$, E1 to E3 are the same as or different from each other, and E1 to E3 have the same definitions as E.

According to one embodiment of the present specification, the air electrode composition may further include other types of perovskite-type oxide particle in addition the perovskite-type oxide particle represented by Chemical Formula 1 as necessary, and types of the perovskite-type oxide particle are not particularly limited.

For example, according to one embodiment of the present specification, one or more of lanthanum strontium manganese oxide (LSM), lanthanum strontium cobalt ferrite (LSCF), lanthanum strontium gallium magnesium oxide (LSGM), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC) and barium strontium cobalt ferrite (BSCF) may be further included as the perovskite-type oxide particle.

According to one embodiment of the present specification, the electrolyte material is a material used for forming an electrolyte layer of a fuel cell, and may include a solid oxide having ion conductivity, or may be a solid oxide having ion conductivity.

*70 Specifically, according to one embodiment of the present specification, the electrolyte material is not particularly limited as long as it is capable of being generally used in the art, and examples thereof may include one or more types selected from the group consisting of zirconia-based that is not doped or is doped with at least one of gadolinium, yttrium, scandium, calcium and magnesium; ceria-based that is not doped or is doped with at least one of gadolinium, samarium, lanthanum, ytterbium and neodymium; bismuth oxide-based that is not doped or is doped with at least one of calcium, strontium, barium, gadolinium and yttrium; and lanthanum gallate-based that is not doped or is doped with at least one of strontium and magnesium.

More specifically, according to one embodiment of the present specification, the electrolyte material may include one or more types selected from the group consisting of gadolinium-doped ceria (GDC), gadolinium-doped zirconia (GDZ), samarium-doped ceria (SDC), samarium-doped zirconia (SDZ), yttrium-doped ceria (YDC), yttrium-doped zirconia (YDZ), yttria-stabilized zirconia (YSZ), scandia-stabilized zirconia (ScSZ), lanthanum strontium gallate magnesite (LSGM) and lanthanum-doped ceria (LDC).

According to one embodiment of the present specification, the electrolyte material may preferably include one or more types selected from the group consisting of gadolinium-doped ceria (GDC), samarium-doped ceria (SDC), yttrium-doped ceria (YDC), lanthanum strontium gallate magnesite (LSGM) and lanthanum-doped ceria (LDC).

According to one embodiment of the present specification, the YSZ is yttria-stabilized zirconium oxide, and may be expressed by $(Y_2O_3)_x(ZrO_2)_{1-x}$ with x being from 0.05 to 0.15, and the ScSZ is scandia-stabilized zirconium oxide, and may be expressed by $(Sc_2O_3)_x(ZrO_2)_{1-x}$ with x being from 0.05 to 0.15. In addition, according to one embodiment of the present specification, the SDC is samarium-doped ceria, and may be expressed by $(Sm_2O_3)_x(CeO_2)_{1-x}$ with x being from 0.02 to 0.4, and the GDC is gadolinium-doped ceria, and may be expressed by $(Gd_2O_3)_x(CeO_2)_{1-x}$ with x being from 0.02 to 0.4.

According to one embodiment of the present specification, a weight ratio of the oxide particle to the electrolyte material in the air electrode composition is preferably in a range of 9:1 to 3:7 and more preferably in a range of 6:4 to 4:6. The content ratio of the oxide particle to the electrolyte material being 9:1 or greater is effective in preventing air electrode degradation and increasing long-term durability through controlling a coefficient of thermal expansion, and the content ratio being 3:7 or less is effective in preventing an electrical conductivity decrease while securing a minimum site of a triple phase boundary at which an electrochemical reaction occurs for intrinsic air electrode function.

According to one embodiment of the present specification, when the air electrode composition includes the oxide particle having a perovskite-type structure represented by Chemical Formula 1 and the electrolyte material, excellent sheet resistance (area specific resistance, ASR) performance is obtained compared to lanthanum strontium cobalt ferrite (LSCF), an existing air electrode material, and since changes in the sheet resistance are small with a passage of time, an effect of having low performance decline is obtained when used in a battery.

Also in the experimental examples of the present specification, it is identified that, when using Sr including existing lanthanum strontium cobalt ferrite (LSCF) instead of Ba of the present disclosure and comparing with a case of Bi and Ba ratio being 1:9, an air electrode using the air electrode material according to one embodiment of the present disclosure has a lower sheet resistance, and results of measuring sheet resistance depending on temperature changes are shown in FIG. 1.

According to one embodiment of the present specification, the air electrode composition preferably has sheet resistance (ASR) of 2 $\Omega cm^2$ or less under a temperature condition of 600° C. to 700° C. In other words, the air electrode composition having sheet resistance of 2 $\Omega cm^2$ or less is effective in preventing fuel cell performance decline by the air electrode.

According to one embodiment of the present specification, the oxide particle having a perovskite-type structure represented by Chemical Formula 1 has a similar coefficient of thermal expansion (CTE) with the electrolyte material, and has excellent chemical resistance with an electrolyte.

In the present specification, a coefficient of thermal expansion means a ratio between thermal expansion of an object under a constant pressure and a temperature, and in the experimental examples of the present specification, changes in the length depending on changes in the temperature from room temperature to 800° C. are measured.

In other words, a fuel cell has a multilayer structure, and therefore, coefficients of thermal expansion between the cell constituents need to similar so as not to produce cracks and separation, and the oxide particle according to one embodiment of the present specification has a similar coefficient of thermal expansion with an electrolyte material unlike other materials exhibiting excellent sheet resistance performance compared to lanthanum strontium cobalt ferrite (LSCF), an existing air electrode material, which is effective in exhibiting excellent chemical stability when used in a fuel cell.

According to one embodiment of the present specification, the oxide particle preferably has a coefficient of thermal expansion in a range of $11 \times 10^{-6}/C$ to $13 \times 10^{-6}/C$. The oxide particle having a coefficient of thermal expansion of $11 \times 10^{-6}/C$ or greater is effective in exhibiting excellent durability in the long term due to a similar thermal behavior with an electrolyte, and the oxide particle having a coefficient of thermal expansion of $13 \times 10^{-6}/C$ or less is effective in securing durability in the long term by preventing problems such as peel-off defects due to stress caused by a difference in the coefficient of thermal expansion with an electrolyte.

Also in the experimental examples of the present specification, it is identified that the air electrode material according to the present disclosure has a more similar coefficient of thermal expansion with a liquid electrolyte compared to lanthanum strontium cobalt ferrite (LSCF), an existing air electrode material that has been used in the art, and it means chemical durability is more superior when forming an air electrode of a fuel cell using the air electrode composition according to the present disclosure.

According to one embodiment of the present specification, the air electrode composition may have a paste or slurry form.

According to one embodiment of the present specification, the air electrode composition may further include one or more of a solvent, a dispersant, a binder resin and a plasticizer.

According to one embodiment of the present specification, the solvent is not particularly limited as long as it is capable of dissolving the binder resin, and may include one or more types selected from the group consisting of butyl carbitol, terpineol and butyl carbitol acetate.

According to one embodiment of the present specification, the binder resin is not particularly limited as long as it is a binder resin capable of providing adhesive strength, and may be polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluorine rubber, various copolymers thereof, and the like.

According to one embodiment of the present specification, the air electrode composition includes the oxide particle, the electrolyte material and a binder, and a content ratio of the oxide particle and the binder may be from 7:3 to 3:7 and more preferably 6:4 based on the weight.

When the content ratio of the oxide particle to the binder satisfies the above-mentioned range, target air electrode porosity of 20% to 60% may be formed, and an effect of preparing paste having viscosity to readily form an electrode is obtained.

According to one embodiment of the present specification, the air electrode composition preferably has viscosity in a range of 10,000 cPs to 100,000 cPs. When the air electrode composition has viscosity in the above-mentioned numerical range, an electrode may be readily formed.

According to one embodiment of the present specification, the solvent content is in a range of 10% by weight to 20% by weight with respect to the total weight of the air electrode composition. The solvent content being 10% by weight or greater has an effect of simple handling during an electrode forming process through paste or slurry, and the solvent content being 20% by weight or less is effective in preventing paste or slurry spreading when forming an electrode.

According to one embodiment of the present specification, a dispersant content is in a range of 5% by weight to 15% by weight with respect to the total weight of the air electrode composition. The dispersant content being 5% by weight or greater has an effect of uniform dispersion with organic substances including the oxide particle, the binder, and the solvent, and the content being 15% by weight or less is effective in shortening a removing process caused by an excessive dispersant addition.

Another embodiment of the present specification provides a method for preparing the air electrode composition including weighing of adjusting the content of constituents of the air electrode composition and preparing the constituents; and mixing the constituents of the air electrode composition through dispersion.

According to one embodiment of the present specification, the constituents of the air electrode composition include the oxide particle represented by Chemical Formula 1 and the electrolyte material.

In addition, according to one embodiment of the present specification, the constituents of the air electrode composition include, in addition to the oxide particle, one or more selected from the group consisting of a solvent, a dispersant, a binder and a plasticizer.

Another embodiment of the present specification provides an air electrode including the air electrode composition.

According to one embodiment of the present specification, the air electrode may be formed by coating the air electrode composition on an electrolyte, and then sintering the result. Specifically, the air electrode may be formed by coating the air electrode composition on an electrolyte, and then sintering the result in a temperature range of 700° C. to 1,100° C.

Another embodiment of the present specification provides a method for preparing an air electrode including forming an electrode using the air electrode composition.

Specifically, the method for preparing an air electrode may include coating the air electrode composition on an electrolyte, and then sintering the result.

The coating may be direct coating using various coating methods such as screen printing and dip coating. However, the electrolyte on which the composition is coated may additionally include a functional layer such as a reaction prevention layer in order to more effectively prevent a reaction between the electrolyte and the electrode.

According to one embodiment of the present specification, the sintering may be carried out in a temperature range of 700° C. to 1,100° C.

Another embodiment of the present specification provides a method for manufacturing a fuel cell including forming an air electrode by coating the air electrode composition on an electrolyte surface and then sintering the result; and forming a fuel electrode on a surface opposite to the air electrode-formed surface of the electrolyte.

Another embodiment of the present specification provides an air electrode formed with the air electrode composition.

According to one embodiment of the present specification, a content ratio of the oxide particle to the electrolyte material in the air electrode composition is preferably in a range of 9:1 to 3:7 and more preferably in a range of 6:4 to 4:6. The content ratio of the oxide particle to the electrolyte material being 9:1 or greater is effective in preventing air electrode degradation and increasing long-term durability through controlling a coefficient of thermal expansion, and the content ratio being 3:7 or less is effective in preventing an electrical conductivity decrease while securing a minimum site of a triple phase boundary at which an electrochemical reaction occurs for intrinsic air electrode function.

Another embodiment of the present specification provides a fuel cell including the air electrode; a fuel electrode; and an electrolyte provided between the air electrode and the fuel electrode.

According to one embodiment of the present specification, the electrolyte may include a solid oxide having ion conductivity.

Specifically, according to one embodiment of the present specification, the electrolyte is not particularly limited as long as it is capable of being generally used in the art, and examples thereof may include one or more types selected from the group consisting of zirconia-based that is not doped or is doped with at least one of gadolinium, yttrium, scandium, calcium and magnesium; ceria-based that is not doped or is doped with at least one of gadolinium, samarium, lanthanum, ytterbium and neodymium; bismuth oxide-based that is not doped or is doped with at least one of calcium, strontium, barium, gadolinium and yttrium; and lanthanum gallate-based that is not doped or is doped with at least one of strontium and magnesium.

More specifically, according to one embodiment of the present specification, the electrolyte may include one or more types selected from the group consisting of gadolinium-doped ceria (GDC), gadolinium-doped zirconia (GDZ), samarium-doped ceria (SDC), samarium-doped zirconia (SDZ), yttrium-doped ceria (YDC), yttrium-doped zirconia (YDZ), yttria-stabilized zirconia (YSZ), scandia-stabilized zirconia (ScSZ), lanthanum strontium gallate magnesite (LSGM) and lanthanum-doped ceria (LDC).

According to one embodiment of the present specification, the YSZ is yttria-stabilized zirconium oxide, and may be expressed by $(Y_2O_3)_x(ZrO_2)_{1-x}$ with x being from 0.05 to 0.15, and the ScSZ is scandia-stabilized zirconium oxide, and may be expressed by $(Sc_2O_3)_x(ZrO_2)_{1-x}$ with x being from 0.05 to 0.15. In addition, according to one embodiment of the present specification, the SDC is samarium-doped ceria, and may be expressed by $(Sm_2O_3)_x(CeO_2)_{1-x}$ with x being from 0.02 to 0.4, and the GDC is gadolinium-doped ceria, and may be expressed by $(Gd_2O_3)_x(CeO_2)_{1-x}$ with x being from 0.02 to 0.4.

According to one embodiment of the present specification, cermet mixing the materials included in the electrolyte described above and nickel oxide may be used as the fuel electrode. Furthermore, the fuel electrode may additionally include active carbon.

According to one embodiment of the present specification, the fuel cell may be manufactured using common methods for manufacturing fuel cells used in the art except that the air electrode is an electrode.

According to one embodiment of the present specification, the fuel cell may be a phosphoric acid-type fuel cell (PAFC), an alkali-type fuel cell (AFC), a polymer electrolyte membrane-type fuel cell (PEMFC), a direct methanol fuel cell (DMFC), a molten carbonate fuel cell (MCFC) and a solid oxide fuel cell (SOFC). Among these, the fuel cell according to one embodiment of the present specification is preferably a solid oxide fuel cell (SOFC).

Another embodiment of the present specification provides a cell module including the fuel cell as a unit cell.

According to one embodiment of the present specification, the cell module may include a stack including a unit cell including the fuel cell and a separator provided between the unit cells; a fuel supply unit supplying fuel to the stack; and an oxidizer supply unit supplying an oxidizer to the stack.

Hereinafter, the present disclosure will be described in detail with reference to examples in order to specifically describe the present disclosure. However, the examples according to the present disclosure may be modified to various different forms, and the scope of the present disclosure is not limited to the examples described below. The examples of the present disclosure are provided in order to more fully describe the present disclosure to those having average knowledge in the art.

Example 1

After weighing 0.5 mol of $Bi_2O_3$, 0.5 mol of $BaCO_3$ and 1.0 mol of $Fe_2O_3$, the raw materials were uniformly mixed using a ball mill, and then placed in an alumina crucible. In a furnace under atmospheric atmosphere, the temperature was raised by 5° C. per minute, the result was heat treated for 3 hours at 1000° C., and then the temperature was lowered by 5° C. per minute to prepare a composite oxide particle.

An air electrode composition including the composite metal oxide particle in 30 wt % based on the total weight of the whole composition, an electrolyte GDC particle in 30 wt % based on the total weight of the whole composition, and ESL441 in 40 wt % based on the total weight of the whole composition as a binder was prepared to a paste form using a 3-roll mill to prepare an electrode material.

GDC (Gd 10% doped Ce oxide) manufactured by Rhodia was used as an electrolyte support (thickness: 1000 μm), and the air electrode composition was coated on both surfaces of the electrolyte using a screen printing method. The result was dried and then heat treated at 1000° C. to form an air electrode.

Comparative Example 1

An air electrode composition including LSCF6428 composite metal oxide particle manufactured by FCM, Ltd. in 60 wt % based on the total weight of the whole composition, and ESL441 in 40 wt % based on the total weight of the whole composition as a binder was prepared to a paste form using a 3-roll mill to prepare an electrode material.

GDC (Gd 10% doped Ce oxide) manufactured by Rhodia was used as an electrolyte support (thickness: 1000 μm), and the air electrode composition was coated on both surfaces of the electrolyte using a screen printing method. The result was dried and then heat treated at 1000° C. to form an air electrode.

Comparative Example 2

*124 An air electrode was formed in the same manner as in Comparative Example 1 except that a material oxidizing a compound represented by $Bi_{0.5}Sr_{0.5}Fe_{1.0}$ was used as the oxide particle.

Comparative Example 3

An air electrode was formed in the same manner as in Comparative Example 1 except that a material oxidizing a compound represented by $Bi_{0.1}Sr_{0.9}Fe_{1.0}$ was used as the oxide particle.

Components of the composite oxide particle prepared through Example 1 and Comparative Examples 1 to 3 are specifically as listed in the following Table 1.

TABLE 1

| | Component (mol %) |
|---|---|
| Example 1 | $(Bi_{0.5}Ba_{0.5})$—Fe—$O_3$ + GDC |
| Comparative Example 1 | $(La_{0.6}Sr_{0.4})$—$(Co_{0.2}F_{0.8})$—$O_3$ |
| Comparative Example 2 | $(Bi_{0.5}Sr_{0.5})$—Fe—$O_3$ |
| Comparative Example 3 | $(Bi_{0.1}Ba_{0.9})$—Fe—$O_3$ |

<Experimental Example 1> Measurement of Sheet Resistance (ASR)

As for sheet resistance measurement, sheet resistance was measured by connecting a platinum (Pt) wire to each of the prepared air electrodes, and then using a 4-prove 2-wire method. Herein, Solartron 1287 and 1260 were used as the measuring device. After that, sheet resistance was measured at scheduled hours while maintaining for 500 hours Results of measuring the sheet resistance (ASR) of Example 1 and Comparative Examples 1 to 3 for 500 hours are shown in FIG. 1.

<Experimental Example 2> Measurement of Coefficient of Thermal Expansion (CTE)

As for measurement of the coefficient of thermal expansion, the oxide particle was formed to a size of 5 mm×5 mm×20 mm, and changes in the thermal expansion were measured up to 800° C. with 5° C. per minute using a dilatometer. As the measuring device used herein, L75 Model manufactured by LINSEIS was used.

Results of measuring the coefficient of thermal expansion (CTE) of Example 1 and Comparative Examples 1 to 3 are shown in the following Table 2.

TABLE 2

| Material | CTE ($10^{-6}$/K) |
|---|---|
| Liquid Electrolyte (Electrolyte) | 8~12 |
| Comparative Example 1 | 14~16 |
| Comparative Example 2 | 13~14 |
| Comparative Example 3 | 13~14 |
| Example 1 | 12 |

As shown in Table 2, it was identified that the material including bismuth barium iron oxide (BiBF) and GDC used in Example 1 of the present disclosure had a more similar coefficient of thermal expansion with a liquid electrolyte compared to lanthanum strontium cobalt ferrite (LSCF) used in Comparative Example 1 and the materials used in Comparative Examples 2 and 3, and accordingly, it was seen that chemical resistance was more superior when used in a fuel cell.

Hereinbefore, embodiments of the present application have been described with reference to accompanying drawings, however, the present application is not limited to the embodiments and may be prepared in various forms that are different from each other, and those having common knowledge in the art will understand that the present application may be implemented in other specific forms without changing technological ideas or essential features of the present application. Accordingly, embodiments described above needs to be construed as being illustrative in all aspects, and being not limitative.

The invention claimed is:

1. An air electrode composition comprising:
an oxide particle represented by the following Chemical Formula 1 and having a perovskite-type ($ABO_3$) structure; and
an electrolyte material:

$$Bi_x(M1)_{1-x} \quad \text{[Chemical Formula 1]}$$

wherein, in Chemical Formula 1, $0.2 < x < 0.8$;

M1 is one or more elements selected from the group consisting of barium (Ba), sodium (Na), potassium (K) and gadolinium (Gd);
E is one or more elements selected from the group consisting of magnesium (Mg), aluminum (Al), vanadium (V), gallium (Ga), germanium (Ge), niobium (Nb), molybdenum (Mo), indium (In), tin (Sn), hafnium (Hf), tantalum (Ta), tungsten (W), titanium (Ti), chromium (Cr), manganese (Mn), nickel (Ni), cobalt (Co), copper (Cu), zinc (Zn), holmium (Ho), erbium (Er), thulium (Tr), ytterbium (Yb) and iron (Fe); and
δ is a value making the oxide particle electrically neutral.

2. The air electrode composition of claim 1, wherein M1 is barium (Ba).

3. The air electrode composition of claim 1, wherein E is iron (Fe).

4. The air electrode composition of claim 1, wherein Chemical Formula 1 is represented by $Bi_{0.5}Ba_{0.5}FeO_3$.

5. The air electrode composition of claim 1, wherein the electrolyte material includes one or more types selected from the group consisting of zirconia-based that is not doped or is doped with at least one of gadolinium, yttrium, scandium, calcium and magnesium; ceria-based that is not doped or is doped with at least one of gadolinium, samarium, lanthanum, ytterbium and neodymium; bismuth oxide-based that is not doped or is doped with at least one of calcium, strontium, barium, gadolinium and yttrium; and lanthanum gallate-based that is not doped or is doped with at least one of strontium and magnesium.

6. The air electrode composition of claim 1, wherein the electrolyte material includes one or more types selected from the group consisting of gadolinium-doped ceria (GDC), gadolinium-doped zirconia (GDZ), samarium-doped ceria (SDC), samarium-doped zirconia (SDZ), yttrium-doped ceria (YDC), yttrium-doped zirconia (YDZ), yttria-stabilized zirconia (YSZ), scandia-stabilized zirconia (ScSZ), lanthanum strontium gallate magnesite (LSGM) and lanthanum-doped ceria (LDC).

7. The air electrode composition of claim 1, wherein a content ratio of the oxide particle to the electrolyte material in the air electrode composition is in a range of 9:1 to 3:7.

8. The air electrode composition of claim 1, further comprising at least one of a solvent, a dispersant, a binder and a plasticizer.

9. The air electrode composition of claim 1, which has sheet resistance (ASR) of 2 $\Omega cm^2$ or less under a temperature condition of 600° C. to 700° C.

10. The air electrode composition of claim 1, wherein the oxide particle has a coefficient of thermal expansion in a range of $11 \times 10^{-6}$/C to $13 \times 10^{-6}$/C.

11. An air electrode formed with the air electrode composition of claim 1.

12. An air electrode comprising the air electrode composition of claim 1.

13. The air electrode of claim 11, wherein a content ratio of the oxide particle to the electrolyte material in the air electrode is in a range of 9:1 to 3:7.

14. A fuel cell comprising:
the air electrode of claim 11;
a fuel electrode; and
an electrolyte provided between the air electrode and the fuel electrode.

15. A method for manufacturing a fuel cell comprising:
forming an air electrode by coating the air electrode composition of claim 1 on an electrolyte surface and then sintering the result; and
forming a fuel electrode on a surface opposite to the air electrode-formed surface of the electrolyte.

16. A cell module comprising the fuel cell of claim 14 as a unit cell.

* * * * *